Inventor:
John E. Palmer

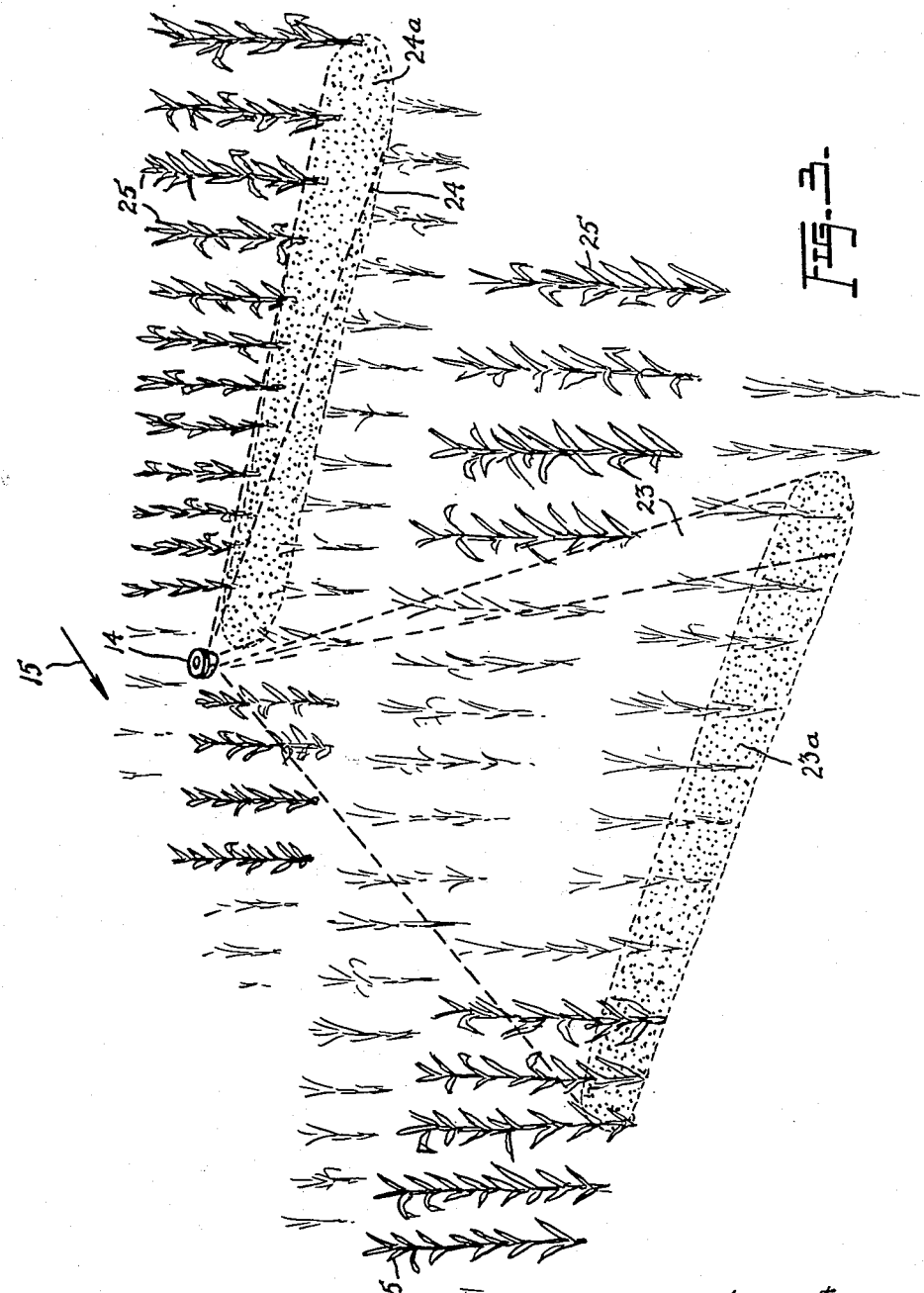

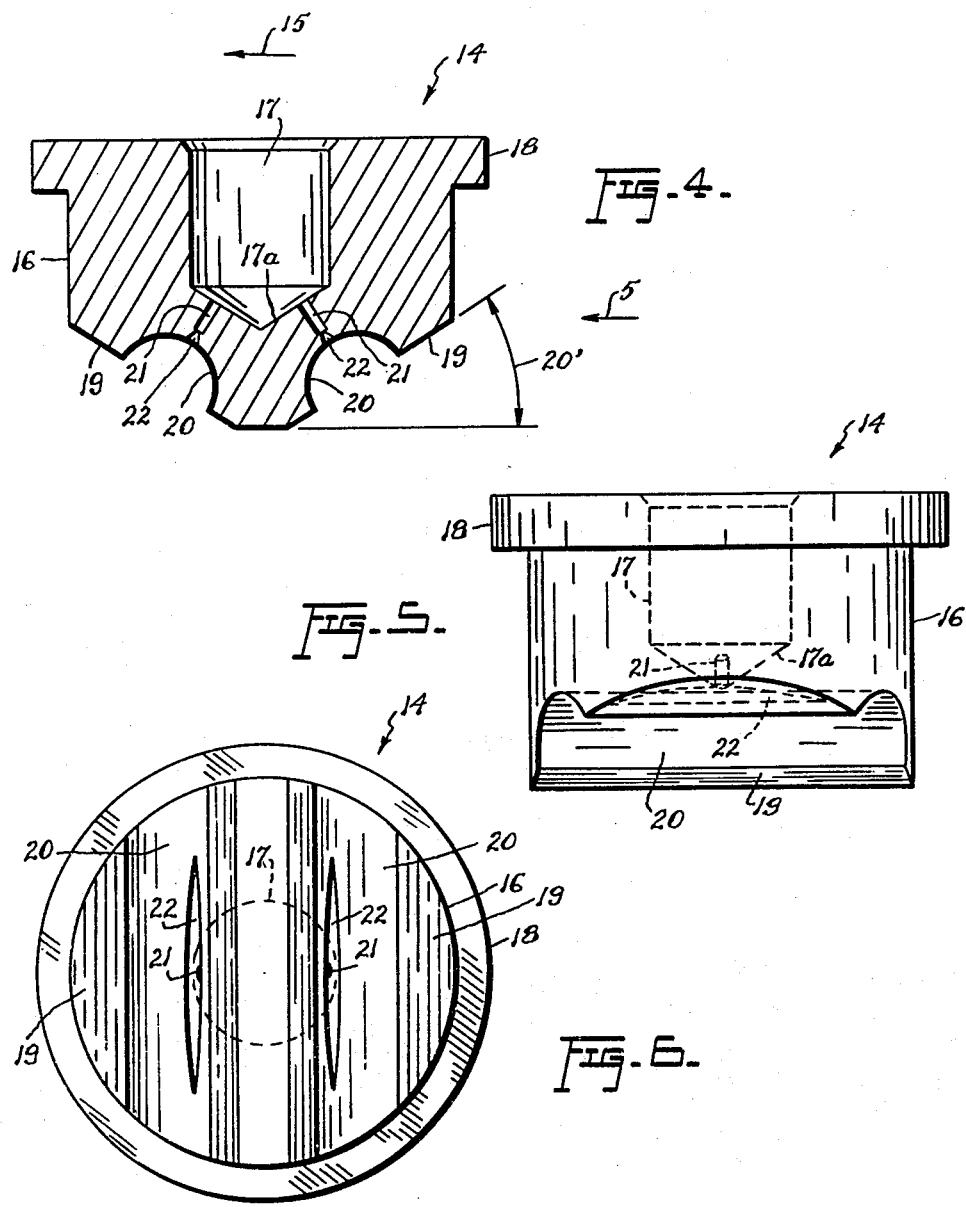

3,191,871
CROP SPRAYERS
John E. Palmer, Calgary, Alberta, Canada, assignor, by mesne assignments, to Golden Arrow Manufacturing Limited, Calgary, Alberta, Canada, a Canadian company
Continuation of application Ser. No. 2,900, Jan. 18, 1960. This application May 16, 1962, Ser. No. 198,396
2 Claims. (Cl. 239—536)

This application is a continuation of my co-pending application Serial No. 2,900, filed January 18, 1960.

This invention relates to new and useful improvements in mobile crop sprayers of the type utilizing a set of spraying nozzles on a boom extending laterally from a wheeled carrier so that spraying fluid is discharged by the nozzles over a strip of ground parallel to the direction of travel of the carrier.

The principal object of the invention is to provide an improved nozzle arrangement for crop sprayers of the above outlined type, whereby each nozzle is provided with a pair of angularly disposed spraying orifices capable of producing a pair of flat fan-shaped, elongated spray patterns which spray the ground in parallel relation. Thus, the nozzles may be arranged on the boom so that one set of spray patterns is directed forwardly and downwardly from the boom and the other set of spray patterns is directed rearwardly and downwardly, and when the sprayer is in motion, the rearwardly directed spray patterns will not only spray over the ground already sprayed by the forwardly directed spray patterns for thorough coverage, but the two sets of spray patterns will facilitate spraying leaves on both sides of upstanding plants, as will be hereinafter more fully explained.

An important feature of the invention, therefore, resides in the particular structure of the spraying nozzle per se, while another important feature involves a particular arrangement of the nozzles on the boom of the sprayer whereby the above outlined advantages are attained.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 3 is a perspective view showing the spray patterns produced by one nozzle;

FIGURE 4 is a vertical sectional view on an enlarged scale of the improved nozzle;

FIGURE 5 is an elevational view, taken in the direction of the arrow 5 in FIGURE 4; and FIGURE 6 is a bottom plan view of the nozzle.

Figure 1:
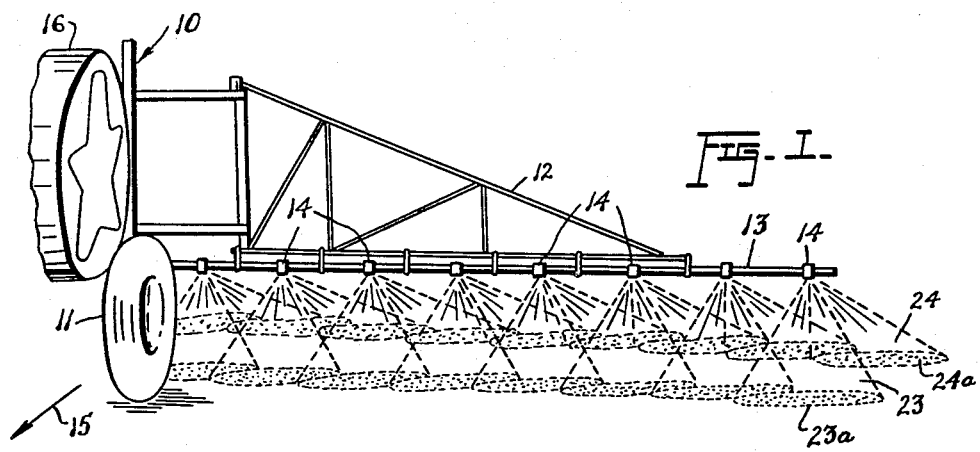
FIGURE 1 is a fragmentary perspective view of a crop sprayer in accordance with the invention, showing the relationship of the spray patterns on the ground.
Figure 2:
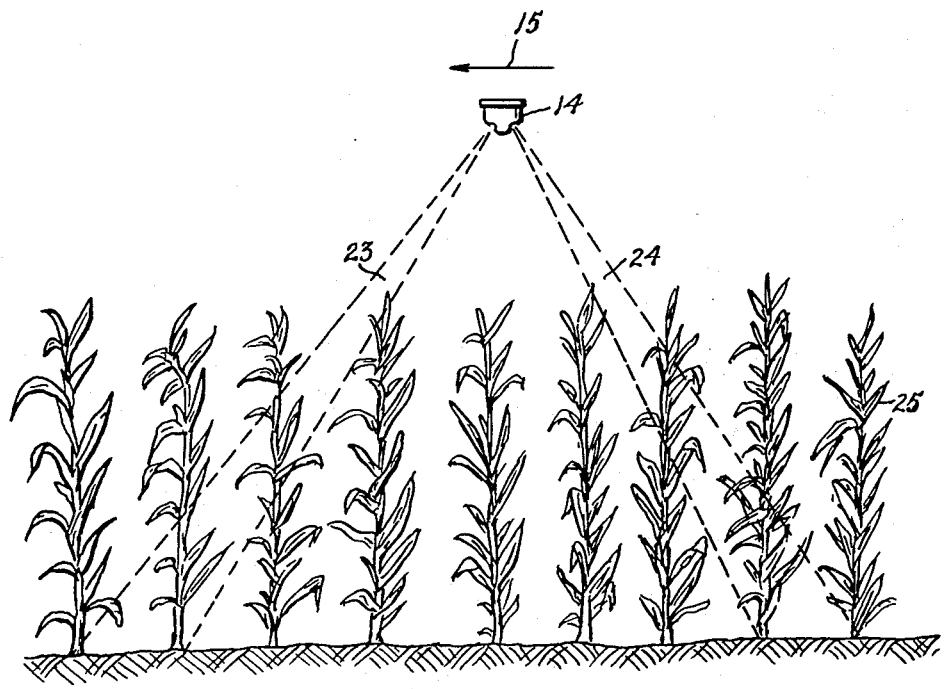
FIGURE 2 is an elevational view showing the relationship of the spray patterns to crop on the ground.

Referring now to the accompanying drawings in detail, the crop sprayer designated generally by the reference numeral 10 includes a suitable wheeled carrier 11 provided at one or both sides thereof with a laterally projecting boom 12, including a substantially horizontal pipe or conduit 13 equipped at longitudinally spaced points thereon with a plurality of spraying nozzles 14 so that fluid sprayed by these nozzles is discharged over a strip of ground parallel to the direction of travel of the sprayer, indicated by the arrow 15. As will be understood, spraying fluid is delivered to the nozzles 14 through the pipe or conduit 13 under pressure from a tank 16 on the carrier 11 in the conventional manner, a detailed description of which is unnecessary.

Referring now to FIGURES 4–6, it will be noted that each of the spraying nozzles 14 comprises a nozzle body 16 provided in its upper portion with a cylindrical chamber 17 having a conical bottom 17a. The upper end of the body 16 is formed with an annular flange 18 whereby the entire nozzle may be attached in any suitable manner to the pipe or conduit 13 so that spraying fluid is delivered from the pipe or conduit into the chamber 17. While the body 16 is cylindrical, the lower portion thereof is provided with two flat faces 19 which are angularly offset from a horizontal plane as indicated at 20' and which, therefore, are also angularly offset from each other. The faces 19 are provided with transverse grooves 20 of a substantially semi-cylindrical cross-section, and a pair of spraying orifices 21 extend from the bottom 17a of the chamber 17, opening into elongated outlets 22 formed in the grooves 20, as is best shown in FIGURES 4 and 6.

In terms of reference to the direction of travel 15 of the sprayer, each nozzle 14 is attached to the pipe 13 so that the grooves 20 are parallel to the pipe and when fluid is discharged under pressure from the nozzle as shown in FIGURE 3, it will flow in two separate spray patterns, one of which may be called a leading spray pattern 23 which is directed forwardly and downwardly from the nozzle, while the other or trailing spray pattern 24 is directed rearwardly and downwardly, it being understood, of course, that the two spray patterns 23, 24 are produced by the respective orifices 21, 21 of the nozzle. The provision of the outlet 22 on each orifice 21 causes the spray to be flat and fan-shaped, so that the areas 23a, 24a sprayed on the ground are elongated and somewhat oval-shaped.

It will be apparent from the foregoing that when the sprayer is travelling in the direction of the arrow 15, each of the nozzles 14 will produce the leading spray pattern 23a in advance of the boom 12 and the trailing spray pattern 24a behind the boom and parallel to the leading spray pattern, both patterns being elongated longitudinally of the boom. Thus, the trailing spray pattern will not only cover the same ground already sprayed by the leading pattern, but since the leading pattern is directed forwardly and the trailing pattern rearwardly, leaves on both sides of upstanding plants 25 will be sprayed in one operation, which is not possible when using conventional nozzles with one orifice producing one fan spray only.

It will be also noted that rather than fastening the nozzles 14 to the pipe 13 so that the grooves 20 are truly parallel to the pipe, the nozzles are fastened so that the grooves of each nozzle are slightly oblique to the pipe, although parallel to the grooves of the other nozzles in the set. As a result, the longitudinal axes of the spray patterns 23a and 24a are correspondingly oriented as is best shown in FIGURE 1, whereby the end portions of the oval spray patterns are staggered or offset, rather than being overlapped. It is desirable, of course, to have the spray patterns as close together as possible for efficient spraying coverage, but crossing of sprays from adjacent nozzles before impact with the ground is undesirable, since the sprays are intermixed and deflected, as occurs when conventional nozzles with conical sprays are employed. By virtue of the oblique arrangement of the nozzles as above explained, the undesirable crossing of sprays from adjacent nozzles and disadvantages arising therefrom are completely eliminated.

In summary it may be noted that while a conventional single fan spray nozzle facilitates overlapping of spray patterns without spray crossing, it cannot simultaneously spray plant leaves from both directions. A conventional cone type spray nozzle can spray plant leaves in both directions, but the spray patterns cannot be overlapped without crossing of sprays from adjacent nozzles. The present invention combines the advantages and eliminates the disadvantages of both types of conventional nozzles by facilitating overlapping of spray patterns without crossing of sprays and spraying plant leaves in both directions at the same time.

While in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. In a mobile crop sprayer, the combination of an elongated boom adapted to extend transversely of the direction of travel of the sprayer, and a plurality of spraying nozzles provided at longitudinally spaced points on said boom, each of said spraying nozzles comprising a body having a spraying fluid receiving chamber therein and provided with an elongated spray outlet in communication with said chamber, said elongated spray outlet being disposed substantially in parallel but slightly obliquely to said boom and adapted to discharge an elongated fan-shaped spray pattern, the spray outlets of said plurality of nozzles being parallel with one another and directed downwardly and laterally to one side of the boom, the longitudinal dimension of the elongated fan-shaped spray pattern produced by each nozzle being greater than the longitudinal spacing of said nozzles on the boom whereby the elongated fan-shaped patterns are longitudinally overlapped but laterally offset by the oblique disposition of the outlets relative to the boom to prevent sprays discharged by adjacent nozzles from interfering with one another.

2. In a spraying nozzle, a nozzle body having an upper portion provided with a substantially cylindrical chamber and a lower portion provided with a flat outer face disposed at an acute angle to the axis of said chamber, said face being provided with an open-ended transversely extending groove, a cylindrical orifice extending at right angles to said face from said chamber into said groove, and an elongated outlet provided at the outer end of said orifice and extending longitudinally in said groove, said outlet having a relatively wide intermediate portion and tapered end portions, said orifice communicating with the wide intermediate portion of the outlet, and said groove being substantially semi-circular in cross-section.

References Cited by the Examiner
UNITED STATES PATENTS

| | | | |
|---|---|---|---|
| 2,086,055 | 7/37 | Taylor | 239—159 |
| 2,597,727 | 5/52 | Hanson | 239—164 |
| 2,683,626 | 7/54 | Wahlin | 239—536 |

EVERETT W. KIRBY, *Primary Examiner.*

MEYER PERLIN, LOUIS J. DEMBO, *Examiners.*